US008049457B2

(12) United States Patent
Okita et al.

(10) Patent No.: US 8,049,457 B2

(45) Date of Patent: Nov. 1, 2011

(54) PRESS MACHINE CONTROLLER

(75) Inventors: Tadashi Okita, Yamanashi (JP); Hiroyuki Kawamura, Yamanashi (JP); Kouki Kameta, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 22 days.

(21) Appl. No.: 12/762,724

(22) Filed: Apr. 19, 2010

(65) Prior Publication Data

US 2011/0006719 A1 Jan. 13, 2011

(30) Foreign Application Priority Data

Jul. 7, 2009 (JP) ................................ 2009-161086

(51) Int. Cl.
*G05B 1/06* (2006.01)

(52) U.S. Cl. ........ 318/638; 318/560; 318/648; 318/652; 318/715; 318/461; 72/429; 72/437; 72/443; 72/446; 72/449; 100/45; 100/74; 100/257; 100/214; 100/281; 100/282; 100/283; 100/251; 100/346; 100/315; 100/316

(58) Field of Classification Search .................... 100/45, 100/74, 257, 214, 280, 281, 282, 283, 251, 100/346, 315, 316; 72/429, 437, 443, 446, 72/449; 318/560, 638, 648, 652, 715, 461
See application file for complete search history.

(56) References Cited

U.S. PATENT DOCUMENTS 4,480,538 A * 11/1984 Yoshida .......................... 100/48
5,094,107 A * 3/1992 Schoch ........................... 73/570
5,140,834 A * 8/1992 Kashiwagi et al. ............ 72/15.2
5,199,290 A * 4/1993 Kashiwagi et al. ............ 72/15.2
5,762,480 A * 6/1998 Adahan ......................... 417/415
6,311,612 B1 * 11/2001 Oen ............................. 100/257
6,470,796 B2 * 10/2002 Hayashi .......................... 100/43
6,606,941 B2 * 8/2003 Oen ................................ 100/35
7,028,611 B2 * 4/2006 Nagae ............................. 100/48

FOREIGN PATENT DOCUMENTS

JP 9285896 A 11/1997
JP 10-249590 A 9/1998
JP 2000084697 3/2000
JP 2005262309 9/2005

OTHER PUBLICATIONS

Notice of Reasons for Rejection for Japanese Application No. 2009-161086 mailed Jul. 27, 2010.

* cited by examiner

*Primary Examiner* — Rita Leykin

(74) *Attorney, Agent, or Firm* — Lowe Hauptman Ham & Berner LLP

(57) ABSTRACT

A press machine controller (10) for controlling a press machine (30) having a servo motor (41) to drive a slide (38) via a reduction mechanism (37) changed in reduction ratio in accordance with the position of the slide (38) is disclosed. The device includes a command generator (20) for generating at least one of a position command, a speed command and a torque command for the servo motor (41); a vibration command generator (13) for generating a vibration command based on a parameter preset for the press machine controller (10); a slide position detector (12) for detecting the position of the slide (38); and a vibration command adding portion (21, 22, 23) for adding the vibration command to any one of the position command, the speed command and the torque command for the servo motor (41) in the case where the slide position is in a predetermined range. The press machine, even if stopped with the slide at the bottom dead center, can be restarted with a small torque.

8 Claims, 8 Drawing Sheets

PRESS MACHINE CONTROLLER

RELATED APPLICATIONS

The present application is based on, and claims priority from, Japanese Application Number 2009-161086, filed Jul. 7, 2009, the disclosure of which is hereby incorporated by reference herein in its entirety.

BACKGROUND OF THE INVENTION

1. Field of the Invention

This invention relates to a press machine controller for controlling a press machine including a servo motor which drives a slide via a reduction mechanism with the reduction ratio changed in accordance with the position of the slide.

2. Description of the Related Art

Conventionally, a mechanical press in which press forming time can be shortened by operating a slide at high speed can be used as a press machine. Japanese Unexamined Patent Publication No. 10-249590 discloses a mechanical press having a link mechanism. The slide of the press machine disclosed in Japanese Unexamined Patent Publication No. 10-249590 moves up and down with the motion of a servo motor transmitted through a link mechanism.

In the press machine disclosed in Japanese Unexamined Patent Publication No. 10-249590, the reduction ratio of the link mechanism for the motor is changed in accordance with the position of the slide. Specifically, the reduction ratio is maximized when the slide reaches the bottom dead center, and at this point, the largest torque is required for the motor.

In the case where the slide simply continues to move through the bottom dead center, the inertia of the motor and the dynamic friction acting on the link mechanism, etc., eliminate the need of a large torque.

However, in the case where the press machine is stopped with the slide located at the bottom dead center for the purpose of confirming the operation of the press machine or otherwise, the inertial force fails to work and the static friction acts on the link mechanism, etc. Therefore, a large torque is required to restart the press machine.

In order to generate a large torque normally not required, the size of the servo motor of the press machine has to be large. However, a large servo motor is expensive, resulting in increased production cost of the press machine.

This invention has been achieved in view of this situation, and the object thereof is to provide a press machine controller whereby the press machine, even if stopped with the slide located at the bottom dead center, can be restarted with a small torque.

SUMMARY OF THE INVENTION

According to a first aspect of the invention, there is provided a press machine controller for controlling a press machine having a servo motor to drive a slide via a reduction mechanism adapted to be changed in reduction ratio in accordance with a position of the slide, comprising: a command generator for generating at least one of a position command, a speed command and a torque command for the servo motor; a vibration command generator for generating a vibration command based on a parameter preset for the press machine controller; a slide position detector for detecting the position of the slide; and a vibration command adding portion for adding the vibration command to any one of the position command, the speed command and the torque command for the servo motor in a case where the slide position detected by the slide position detector is in a predetermined range.

According to a second aspect of the invention, there is provided a press machine controller for controlling a press machine having first and second servo motors to drive a slide via first and second reduction mechanisms, respectively, adapted to be changed in reduction ratio in accordance with a position of the slide, comprising: a first command generator for generating at least one of a position command, a speed command and a torque command for the first servo motor; a second command generator for generating at least one of a position command, a speed command and a torque command for the second servo motor; a vibration command generator for generating a vibration command based on a parameter preset for the press machine controller; a slide position detector for detecting the position of the slide; a first vibration command adding portion for adding the vibration command to any one of the position command, the speed command and the torque command for the first servo motor in a case where the slide position detected by the slide position detector is in a predetermined range; and a second vibration command adding portion for adding the vibration command to any one of the position command, the speed command and the torque command for the second servo motor in a case where the slide position detected by the slide position detector is in the predetermined range; wherein the vibration command added by the first vibration command adding portion is in phase with the vibration command added by the second vibration command adding portion.

According to a third aspect of the invention, there is provided a press machine controller for controlling a press machine having a servo motor to drive a slide via a reduction mechanism adapted to be changed in reduction ratio in accordance with a position of the slide, comprising: a command generator for generating at least one of a position command; a speed command and a torque command for the servo motor; a vibration command generator for generating a vibration command based on a parameter preset for the press machine controller; a vibration adding signal detector for detecting an input of a vibration adding signal permitting an addition of the vibration command; and a vibration command adding portion for adding the vibration command to any one of the position command, the speed command and the torque command for the servo motor in a case where the vibration adding signal is input.

According to a fourth aspect of the invention, there is provided a press machine controller for controlling a press machine having first and second servo motors for driving a slide via first and second reduction mechanisms, respectively, adapted to be changed in reduction ratio in accordance with a position of the slide, comprising: a first command generator for generating at least one of a position command, a speed command and a torque command for the first servo motor; a second command generator for generating at least one of a position command, a speed command and a torque command for the second servo motor; a vibration command generator for generating a vibration command based on a parameter preset for the press machine controller; a vibration adding signal detector for detecting an input of a vibration adding signal permitting an addition of the vibration command; a first vibration command adding portion for adding the vibration command to any one of the position command, the speed command and the torque command for the first servo motor in a case where the vibration adding signal is input; and a second vibration command adding portion for adding the vibration command to any one of the position command, the speed command and the torque command for the second servo motor in a case where the vibration adding signal is input; wherein the vibration command added by the first vibration command adding portion is in phase with the vibration command added by the second vibration command adding portion.

According to a fifth aspect of the invention, there is provided a press machine controller according to any one of the first to fourth aspects, wherein the parameter is included in an external device connected to the press machine controller.

These and other objects, features and advantages of the present invention will be more apparent in light of the detailed description of exemplary embodiments thereof as illustrated by the drawings.

DETAILED DESCRIPTION

Figure 1:
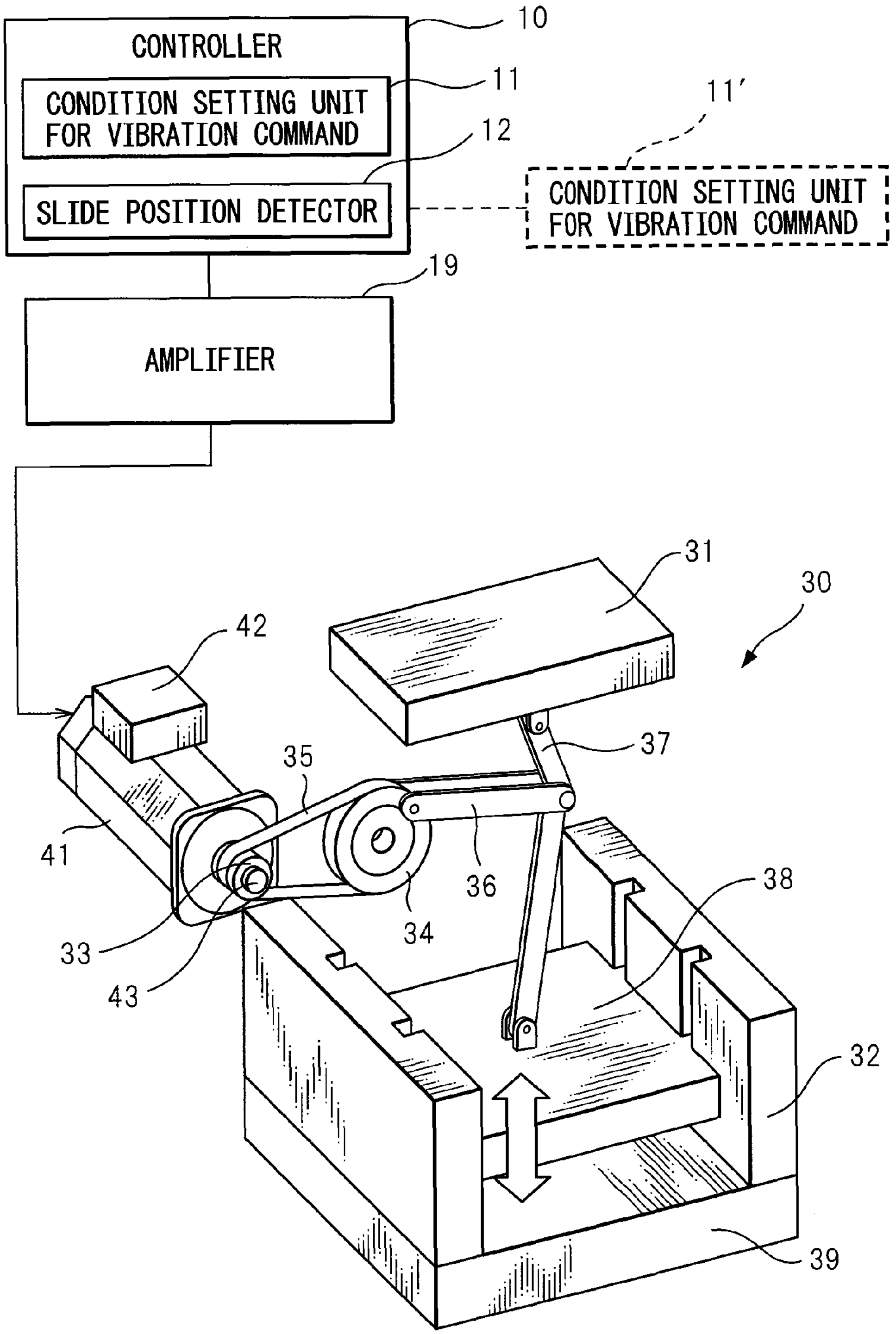
FIG. 1 is a schematic diagram showing a press machine controller and a press machine according to the invention.

The embodiments of the invention are explained below with reference to the accompanying drawings. In the drawings, the same member is designated with a similar reference numeral. To facilitate understanding, the scale of each drawing has been appropriately changed.

FIG. 1 is a schematic diagram showing a press machine controller and a press machine according to the invention. As shown in FIG. 1, a press machine controller 10 is connected to a servo motor 41 of a press machine 30 via an amplifier 19. The press machine 30 is a mechanical press including a bolster 39 with a lower die mounted thereon, and a slide 38 movable vertically along a guide 32 with an upper die mounted thereon.

Figure 2A:
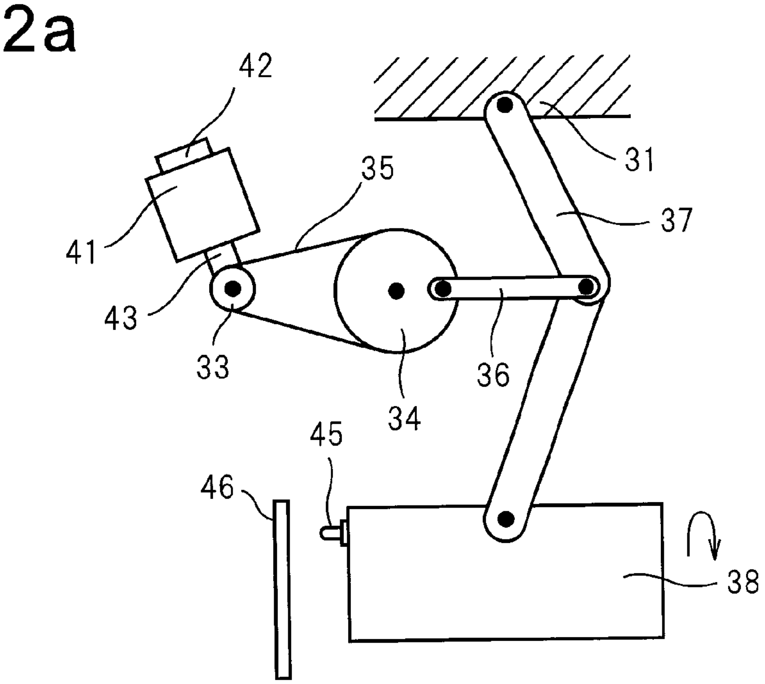
FIG. 2*a* is an enlarged view of a slide and a link mechanism with the slide having reached the top dead center.
Figure 2B:
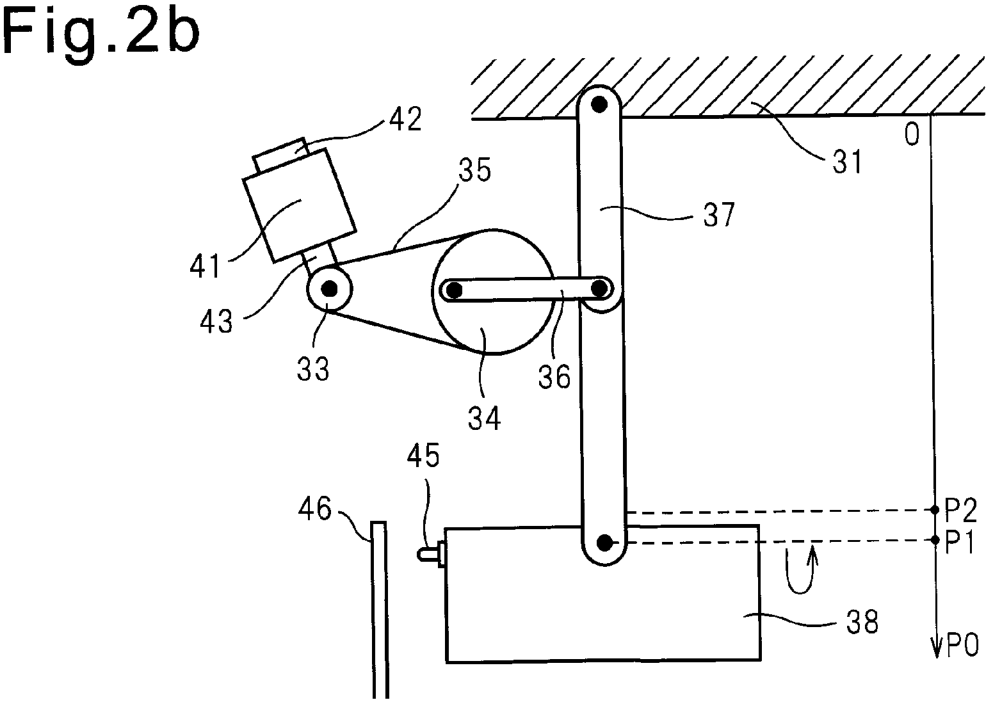
FIG. 2*b* is another enlarged view of the slide and the link mechanism with the slide having reached the bottom dead center.

FIGS. 2*a* and 2*b* are enlarged views of the slide and the link mechanism with the slide having reached the top and bottom dead centers, respectively. As shown in FIGS. 2*a* and 2*b*, the slide 38 is coupled to a fixing unit 31 by a link mechanism 37 configured of two members. The mechanism 37 has rotatably mounted thereon one end of a rod 36, and the other end of the rod 36 is mounted eccentrically on a large pulley 34.

A small pulley 33 is mounted on the output shaft 43 of a servo motor 41. The small pulley 33 and the large pulley 34 are wound with a common belt 35. As a result, the rotational motion of the output shaft 43 of the servo motor 41 is reduced in speed and transmitted to the large pulley 34, and converted to the linear motion of the slide 38 by the rod 36 and the link mechanism 37. As a result, the slide 38 moves up and down relatively to the bolster 39. Incidentally, a position detector 42 for detecting the position of the output shaft 43 is mounted on the servo motor 41. The position detector 42 is, for example, a rotary encoder.

Referring to FIG. 1 again, the press machine controller 10 is a digital computer including a condition setting unit 11 for a vibration command and a slide position detector 12 for detecting the position PO (see FIG. 2*b*) of the slide 38 with respect to the fixing unit 31. The condition setting unit 11 is a memory such as a ROM or a RAM. The condition setting unit 11 includes predetermined various parameters. The parameters include the frequency f and the amplitude A of a micro vibration command and predetermined positions P1, P2 with respect to the fixing unit 31 of the press machine 30.

As can be seen from FIG. 2*b*, the position P1 is the one with respect to the fixing unit 31 with the slide 38 at the bottom dead center, and the position P2 located a predetermined distance above the bottom dead center. As long as the position PO of the slide 38 remains between the positions P1 and P2, the slide 38 is located at the bottom dead center or in the vicinity of the bottom dead center. In such cases, a large torque is required to stop the slide 38 at the bottom dead center and restart the slide 38 in order to check or otherwise confirm the state of the press machine 30.

Incidentally, the condition setting unit 11 is not necessarily included in the press machine controller 10. As indicated by dashed line in FIG. 1, a condition setting unit 11' in the form of an external memory may be connected to the press machine controller 10. Furthermore, the condition setting units 11, 11' may store a machining program for the press machine 30, and the frequency f, etc. may be contained in the machining program.

Figure 3:
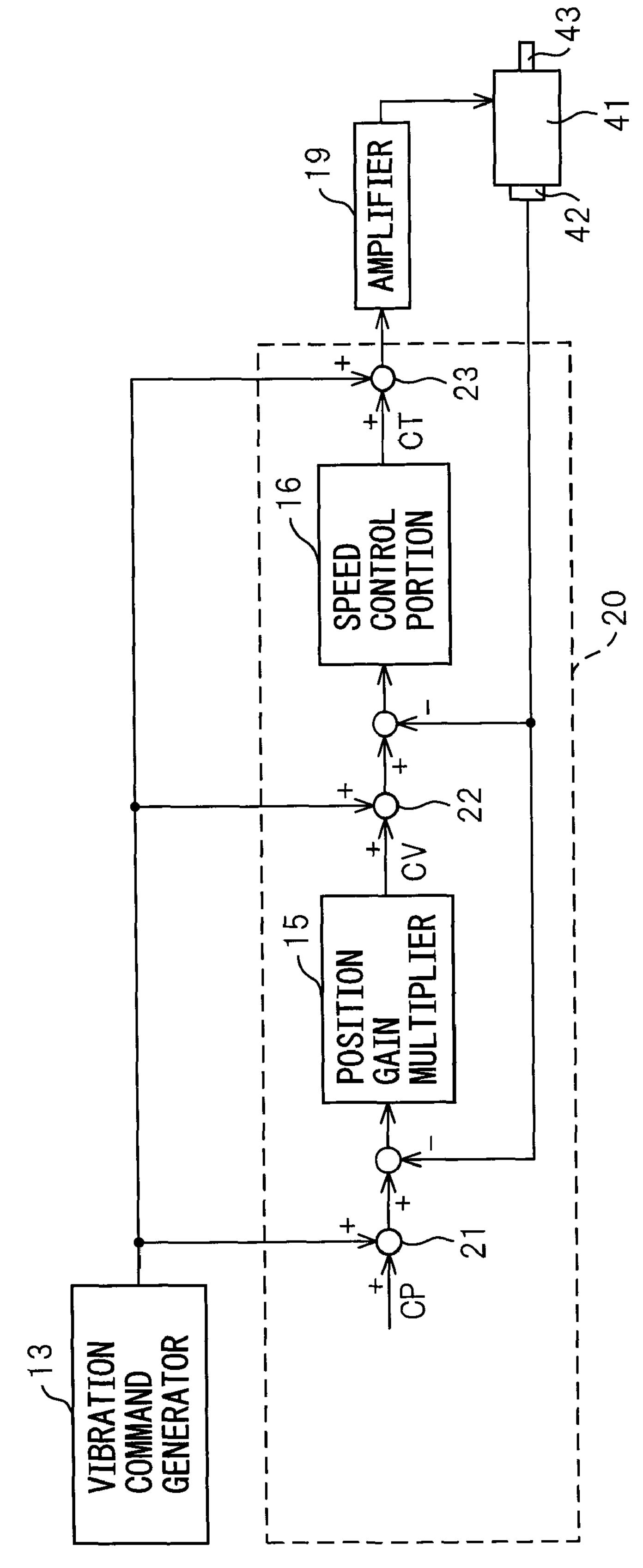
FIG. 3 is a block diagram showing the press machine controller according to a first embodiment of the invention.

FIG. 3 is a block diagram showing the press machine controller according to a first embodiment of the invention. As shown in FIG. 3, the position command CP is read from the machining program for each control period and reduced by the position fed back from the position detector 42 thereby to generate a position deviation. The position deviation is multiplied by a position gain in a position gain multiplier 15 thereby to generate a speed command CV.

Then, the speed feedback data generated based on the change in the position feedback data, within a predetermined time, detected by the position detector 42 is subtracted from the speed command CV thereby to calculate a speed deviation. This speed deviation is input to a speed control portion 16. The speed control portion 16 outputs a torque command CT (current command) based on the speed deviation. In FIG. 3, a section for outputting at least one of the position command CP, the speed command CV and the torque command CT is designated as a command generator 20. The torque command CT is amplified by an amplifier 19 and input to the servo motor 41 thereby to control the drive of the servo motor 41. The series of these operations is repeated for each control period of the press machine controller 10.

Figure 4:
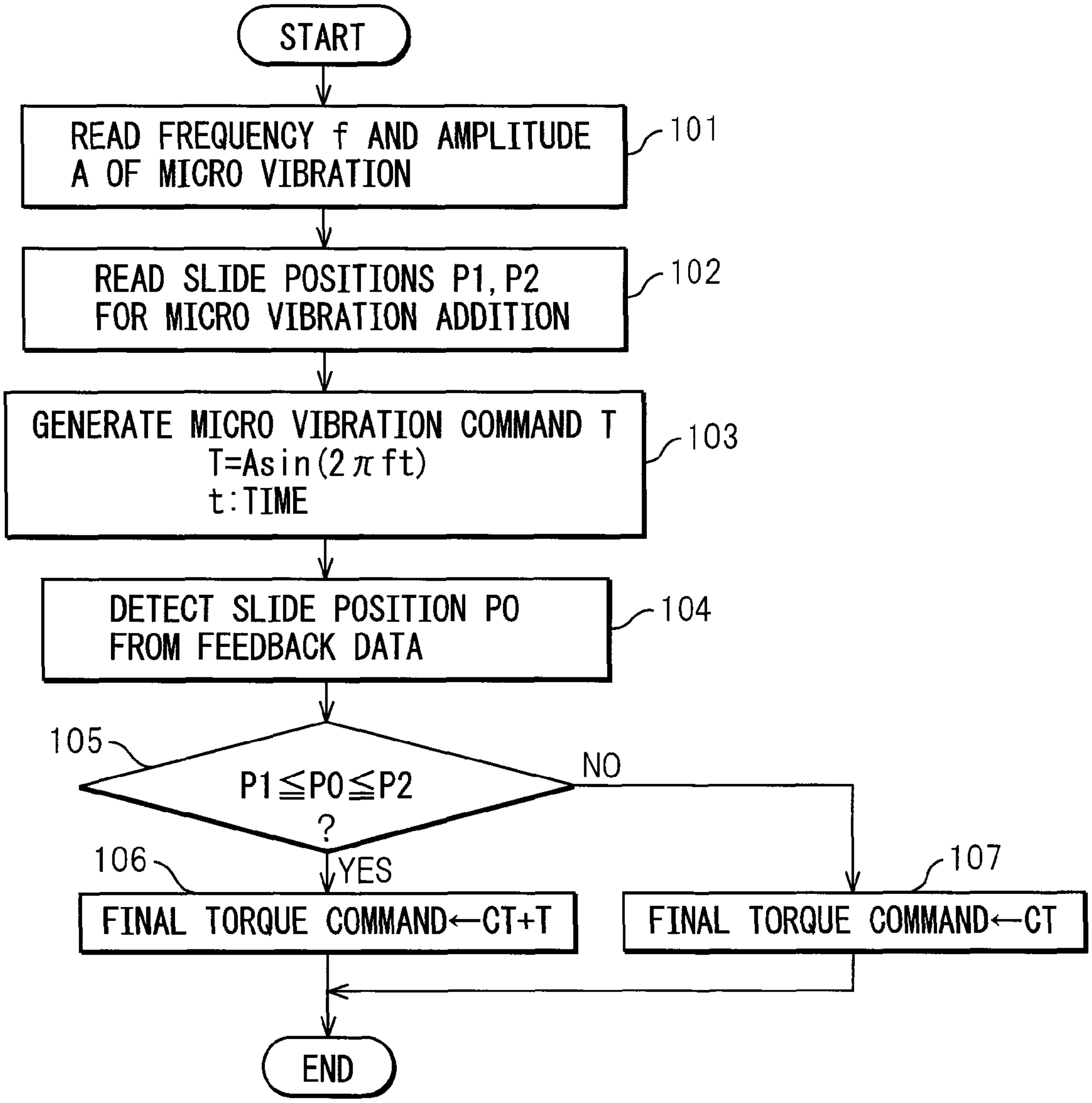
FIG. 4 is a flowchart showing the operation of the press machine controller shown in FIG. 3.

FIG. 4 is a flowchart for the operation of the press machine controller according to the first embodiment of the invention. The operation of the press machine controller 10 according to this invention is explained below with reference to FIGS. 3 and 4.

First, in step 101 shown in FIG. 4, the frequency f and the amplitude A are read from the condition setting unit 11 in the press machine controller 10 or the external condition setting unit 11'. Similarly, the positions P1 and P2 are read in step 102. Incidentally, the frequency f, the amplitude A and the positions P1, P2 read in steps 101, 102 are automatically determined in accordance with the specifics of the press machining operation conducted by the press machine 30.

Then, the process proceeds to step 103, in which the vibration command generator 13 (see FIG. 3) generates a micro vibration command T based on the equation shown below.

$$T=A\cdot\sin(2\pi ft)$$

where t is the time.

Then, in step 104, the slide position detector 12 of the press machine controller 10 detects the present position PO of the slide 38 with respect to the fixing unit 31. Specifically, the position PO of the slide 38 is determined using the position feedback from the position detector 42. As an alternative, the position of the slide 38 may be detected directly using a limit switch 45 arranged on the slide 38 or a linear scale 46 (see FIGS. 2*a* and 2*b*).

Step 105 judges whether the position PO of the slide 38 is located between the predetermined positions P1 and P2. In the case where the position PO of the slide 38 is located between the predetermined positions P1 and P2, the process proceeds to step 106.

In step 106, the micro vibration command T is added to the torque command CT calculated by the speed control portion 16. Specifically, the vibration command adding portion 23 shown in FIG. 3 adds the micro vibration command T to the torque command CT and thereby generates a final torque command.

On the contrary, in the case where step 105 judges that the position PO of the slide 38 is not located between the predetermined positions P1 and P2, the process proceeds to step 107, in which the very torque command CT is employed as the final torque command and the process is ended.

Incidentally, according to the embodiment explained with reference to FIG. 4, the final torque command is generated by the vibration command adding portion 23 adding the vibration command T to the torque command CT. However, instead of generating the final torque command, the final position command may be generated by the vibration command adding portion 21 adding the vibration command T to the position command CP, or the final speed command may be generated by the vibration command adding portion 22 adding the vibration command T to the speed command CV.

As described above, according to this invention, the vibration command T is added to any of the position command CP, the speed command CV and the torque command CT for the servo motor in the case where the slide 38 is located at the bottom dead center or in the vicinity of the bottom dead center. As a result, the slide 38 is vibrated slightly.

As a result, the dynamic friction works at the time of restarting the press machine 30. In other words, according to this invention, no static friction acts on the slide 38, etc., at the time of restarting the press machine 30. For this reason, the press machine 30 can be restarted with a small torque. Consequently, the press machine 30 according to the invention can employ a small servo motor, thereby making it possible to reduce the production cost of the press machine 30.

Figure 5:
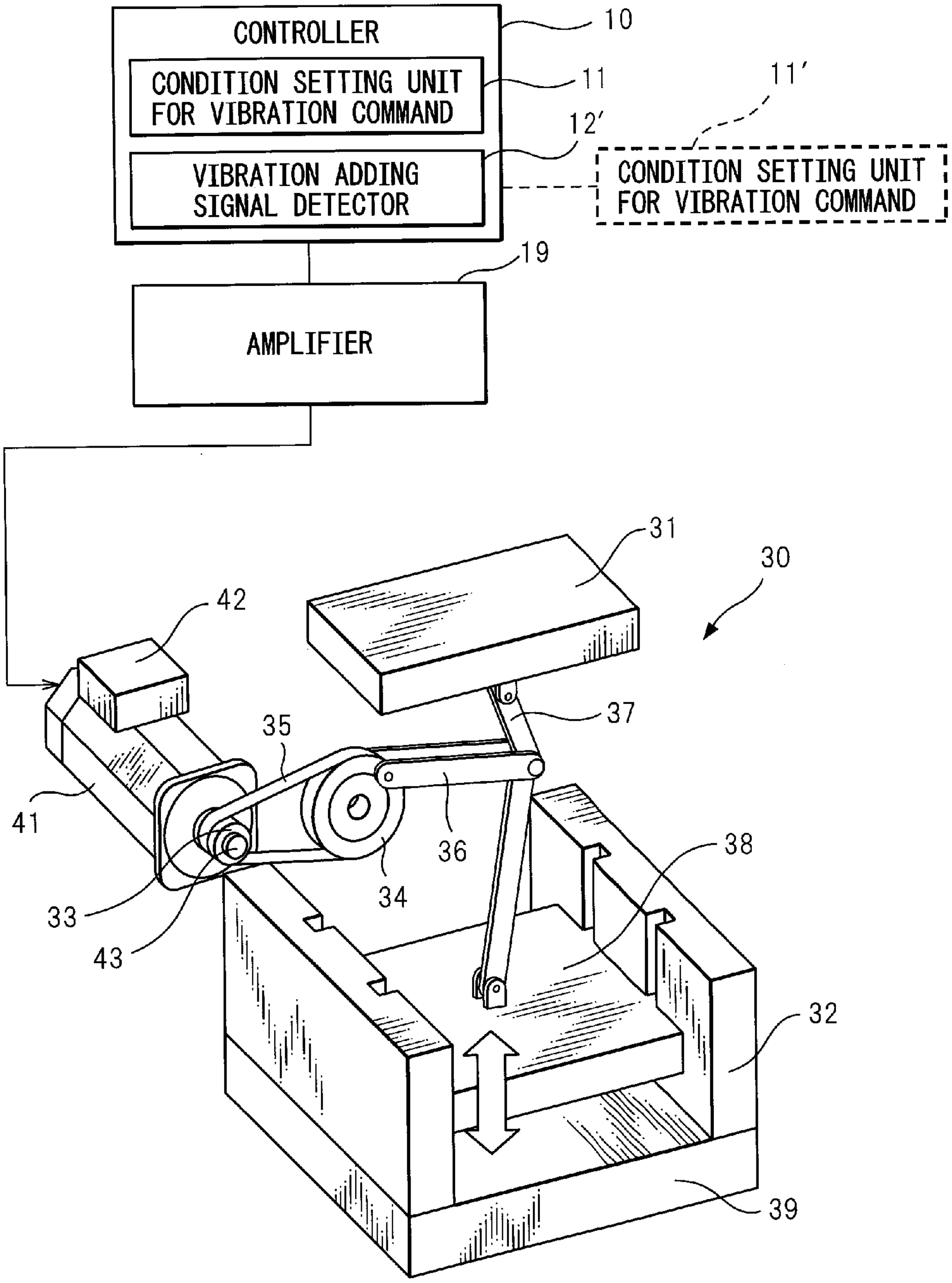
FIG. 5 is a schematic diagram showing the press machine controller and the press machine according to another embodiment of the invention.
Figure 6:
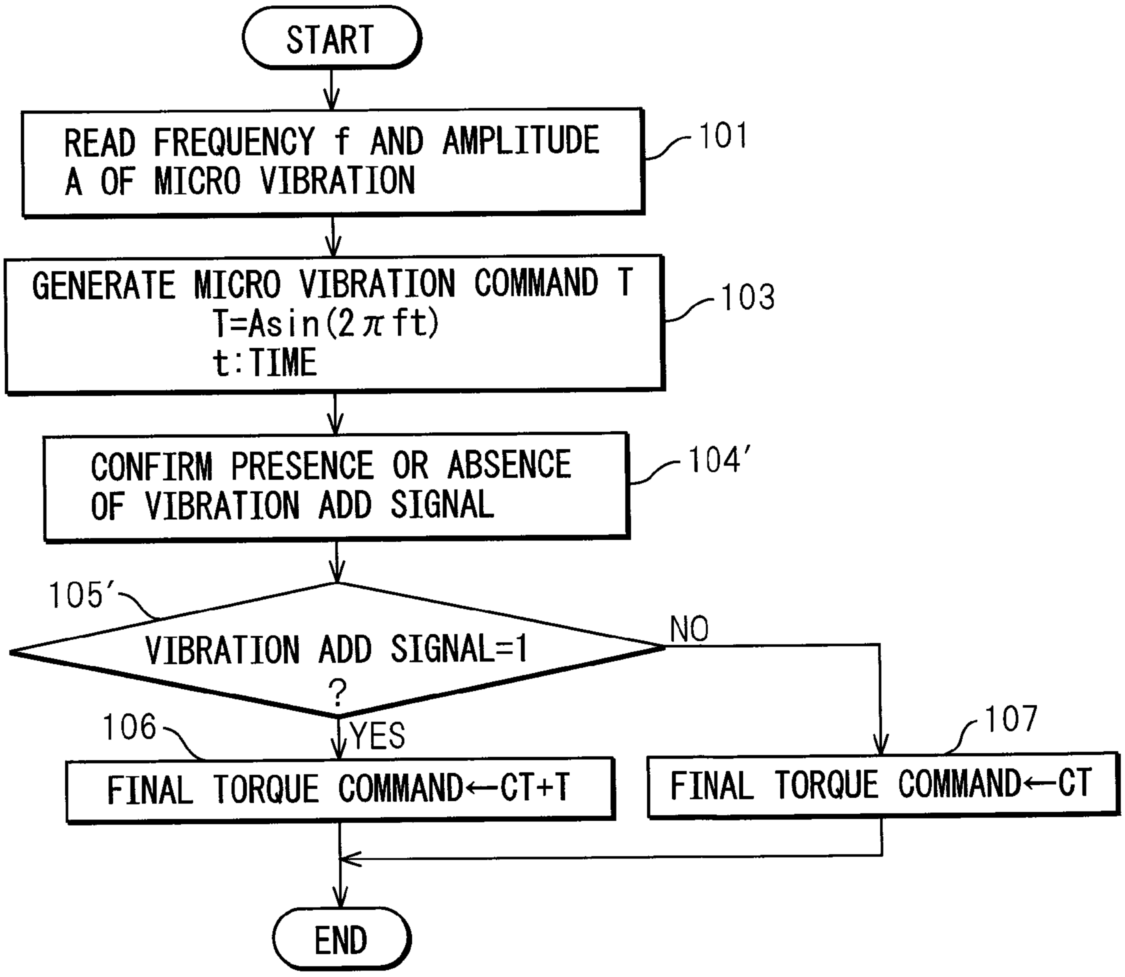
FIG. 6 is a flowchart showing the operation the press machine controller shown in FIG. 5.

In the case where a specific workpiece (not shown) is pressed by the press machine 30, the timing of adding the vibration command (slide position) may be desirably changed according to the workpiece. According to another embodiment shown in FIGS. 5 and 6, a vibration adding signal to permit the addition of the vibration command is input by the operator through a limit switch 45 or other switch (not shown). In this way, the vibration command is added to any of the position command CP, the speed command CV and the torque command CT. FIGS. 5 and 6 are substantially similar to FIGS. 1 and 4, respectively, and therefore, only different points are mainly described below.

As shown in FIG. 5, the controller 10 according to the another embodiment includes, in place the slide position detector 12, a vibration adding signal detector 12' for detecting the input of the vibration adding signal permitting the addition of the vibration command. In FIG. 6 in which step 102 shown in FIG. 4 is eliminated, steps 104', 105' are executed in place of steps 104, 105 shown in FIG. 4.

As can be seen from FIG. 6, the vibration adding signal detector 12' checks to see whether the vibration adding signal is input or not by the operator. In the case where step 105' judges that the vibration adding signal is so input, the process proceeds to step 106 thereby to generate the final torque command by adding, for example, the vibration command T to the torque command CT. On the contrary, in the case where step 105' judges that no vibration adding signal is input, the process proceeds to step 107 thereby to employ the very torque command CT as the final torque command.

In such a case, the position at which the vibration is started can be changed as desired by the operator. Therefore, in pressing a specified workpiece in the press machine 30, the vibration command can be added at the slide position most suitable for the workpiece, thereby making it possible to perform the press machining operation optimally.

Figure 7:
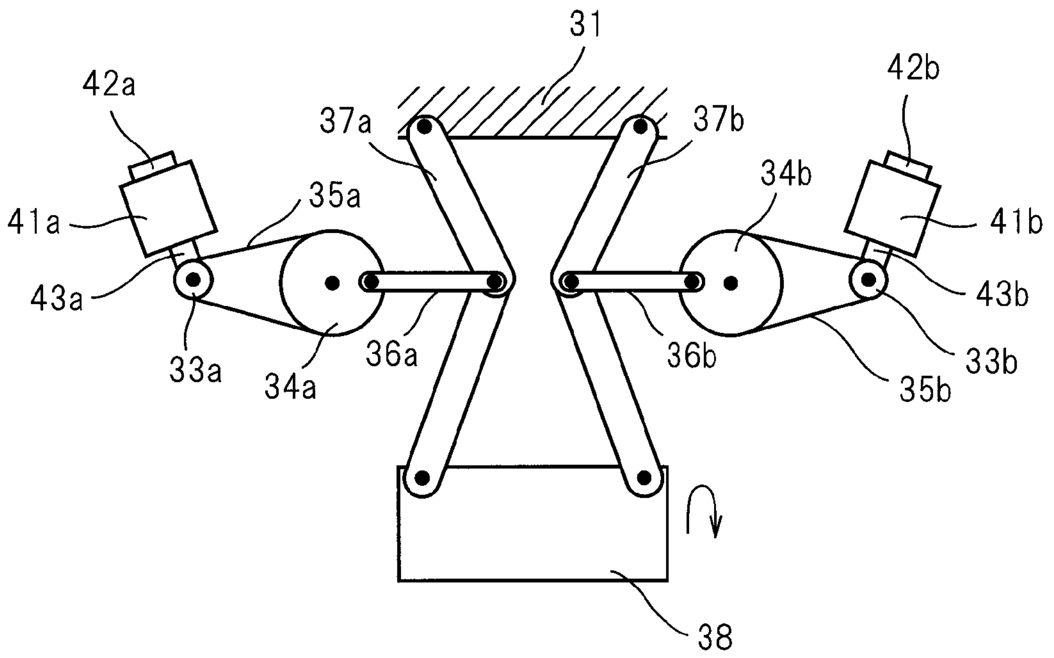
FIG. 7 is an enlarged view of the slide and the link mechanism having another configuration.

FIG. 7 is an enlarged view of the slide and the link mechanism in another configuration. In the another configuration shown in FIG. 7, a single slide 38 is adapted to be moved up and down by the first and second link mechanisms 37*a*, 37*b*. The link mechanisms 37*a*, 37*b*, like the link mechanism 37 described above, are connected to the servo motors 41*a*, 41*b*, respectively. In the description that follows, the first link mechanism 37*a* and the related members are each designated by a reference numeral with an affix "a", and the second link mechanism 37*b* and the related members by a reference numeral with an affix "b". These members are similar to the corresponding members described above and therefore not described again.

Figure 8:
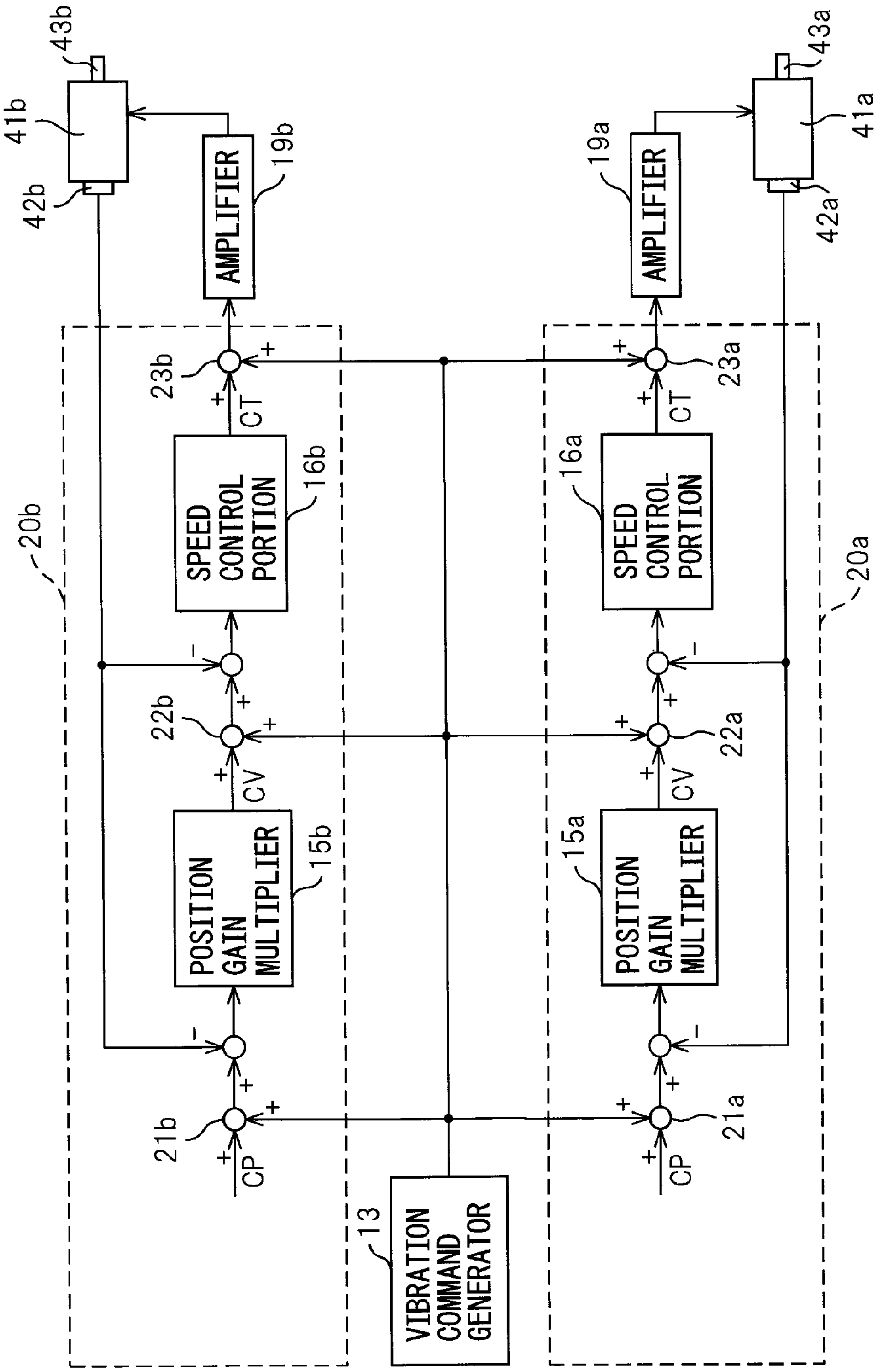
FIG. 8 is a block diagram showing the press machine controller according the second embodiment of the invention.

FIG. 8 is a block diagram showing a press machine controller according to a second embodiment of the invention. As shown in FIG. 8, the device according to this embodiment includes, as the members related to the first servo motor 41*a*, a position gain multiplier 15*a*, a speed control portion 16*a*, an amplifier 19*a* and first vibration command adding portions 21*a*, 22*a*, 23*a* which form a command generator 20*a*. Similarly, the members related to the second servo motor 41*b* include a position gain multiplier 15*b*, a speed control portion 16*b*, an amplifier 19*b* and second vibration command adding portions 21*b*, 22*b*, 23*b* which form a command generator 20*b*. Incidentally, as can be seen from FIG. 8, a vibration command generator 13 is shared by the command generators 20*a*, 20*b*.

In the second embodiment, a similar process to the process described with reference to FIG. 4, etc., is executed. According to the second embodiment, in the case where the vibration command T is added to the torque command CT (see step 106 in FIG. 4), the vibration command adding portions 23*a*, 23*b* add the vibration command T to the torque commands CT for the first and second servo motors 41*a*, 41*b*, respectively. Therefore, the same effect can be obtained in the second embodiment as in the case described above. Further, according to the second embodiment, the vibration command T added to the torque command CT for the first servo motor 41*a* is in phase with the vibration command T added to the torque command CT for the second servo motor 41*b*.

Even in the case where the vibration command T is added to the position command CP or the speed command CV, though not shown in FIG. 4, the vibration command adding portions 21*a*, 21*b* or the vibration command adding portions 22*a*, 22*b* add the vibration command T to the position command CP or the speed command CV, as the case may be, for the first and second servo motors 41*a*, 41*b*. The vibration command T added to the position command CP or the speed command CV for the first servo motor 41*a* is in phase with the vibration command T added to the position command CP or the speed command CV for the second servo motor 41*b*.

In this configuration, at the time of restarting the press machine 30, forces are exerted on the slide 38 at the same timing from the first servo motor 41*a* and the second servo motor 41*b* via the link mechanisms 37*a*, 37*b*, respectively. Therefore, it will be understood, that according to the second embodiment, the press machine 30 can be restarted in stable fashion. The embodiments described above can of course be combined with each other.

Effects of the Invention

According to the first aspect of the invention, the vibration command is added to any one of the position command, the speed command and the torque command of the servo motor. Therefore, the press machine, even if stopped with the slide at the bottom dead center, can be restarted under dynamic friction. As a result, the press machine can be restarted with a small torque. This makes it possible to employ a compact servo motor, with the result that the production cost of the press machine is suppressed. Incidentally, the reduction mechanism is a link mechanism, for example.

According to the second aspect of the invention, a similar effect to the first aspect can be obtained. Further, according to the second aspect, the phase added to the first servo motor side is identical with the phase added to the second servo motor side, and therefore, the timing lag which otherwise might occur between the forces applied from the first and second servo motors to the slide via the reduction mechanism at the time of restarting the press machine, can be avoided. Thus, the press machine can be restarted in stable fashion.

According to the third aspect of the invention, the vibration can be added at an arbitrary timing considered as required by the operator to add the vibration command.

According to the fourth aspect of the invention, the vibration can be added at an arbitrary timing considered as required by the operator to add the vibration command.

According to the fifth aspect of the invention, an external device containing a given parameter can be easily replaced by another external device containing another parameter.

Although the invention has been shown and described with exemplary embodiments thereof, it should be understood by those skilled in the art that the foregoing and various other changes, omissions and additions may be made therein and thereto without departing from the scope of the invention.

The invention claimed is:

1. A press machine controller for controlling a press machine having a servo motor to drive a slide via a reduction mechanism adapted to be changed in reduction ratio in accordance with a position of the slide, comprising:

a command generator for generating at least one of a position command, a speed command and a torque command for the servo motor;

a vibration command generator for generating a vibration command, which is enough to change a situation in which static friction works to a situation in which a dynamic friction works, based on a parameter preset for the press machine controller;

a slide position detector for detecting the position of the slide; and a vibration command adding portion for adding the vibration command to any one of the position command, the speed command and the torque command for the servo motor in a case where the stopped slide position detected by the slide position detector is in a predetermined range including a bottom dead center of the slide, and wherein the torque, required for restarting the press machine after the slide stops at the bottom dead center thereof or in the vicinity of the bottom dead center, becomes small.

2. A press machine controller for controlling a press machine having first and second servo motors to drive a slide via first and second reduction mechanisms, respectively, adapted to be changed in reduction ratio in accordance with a position of the slide, comprising:

a first command generator for generating at least one of a position command, a speed command and a torque command for the first servo motor;

a second command generator for generating at least one of a position command, a speed command and a torque command for the second servo motor;

a vibration command generator for generating a vibration command, which is enough to change a situation in which static friction works to a situation in which a dynamic friction works, based on a parameter preset for the press machine controller;

a slide position detector for detecting the position of the slide;

a first vibration command adding portion for adding the vibration command to any one of the position command, the speed command and the torque command for the first servo motor in a case where the slide position detected by the slide position detector is in a predetermined range; and a second vibration command adding portion for adding the vibration command to any one of the position command, the speed command and the torque command for the second servo motor in a case where the stopped slide position detected by the slide position detector is in the predetermined range including a bottom dead center of the slide;

wherein the vibration command added by the first vibration command adding portion is in phase with the vibration command added by the second vibration command adding portion and wherein the torque, required for restarting the press machine after the slide stops at the bottom dead center thereof or in the vicinity of the bottom dead center, becomes small.

3. A press machine controller for controlling a press machine having a servo motor to drive a slide via a reduction mechanism adapted to be changed in reduction ratio in accordance with a position of the slide, comprising:

a command generator for generating at least one of a position command, a speed command and a torque command for the servo motor;

a vibration command generator for generating a vibration command, which is enough to change a situation in which a dynamic friction works, based on a parameter preset for the press machine controller;

a slide position detector for detecting the position of the slide;

a vibration adding signal detector for detecting an input of a vibration adding signal permitting an addition of the vibration command when the slide, the position thereof is detected by the slide position detector, stops at the bottom dead center of the slide or in the vicinity of the bottom dead center; and a vibration command adding portion for adding the vibration command to any one of the position command, the speed command and the torque command for the servo motor in the case where the vibration adding signal is input and wherein the torque, required for restarting the press machine after the slide stops at the bottom dead center thereof or in the vicinity of the bottom dead center, becomes small.

4. A press machine controller for controlling a press machine having first and second servo motors for driving a slide via first and second reduction mechanisms, respectively, adapted to be changed in reduction ratio in accordance with a position of the slide, comprising:

a first command generator for generating at least one of a position command, a speed command and a torque command for the first servo motor;

a second command generator for generating at least one of a position command, a speed command and a torque command for the second servo motor;

a vibration command generator for generating a vibration command, which is enough to change a situation in which static friction works to a situation in which a dynamic friction works, based on a parameter preset for the press machine controller;

a slide position detector for detecting the position of the slide;

a vibration adding signal detector for detecting an input of a vibration adding signal permitting an addition of the vibration command when the slide, the position thereof is detected by the slide position detector, stops at the bottom dead center of the slide or in the vicinity of the bottom dead center;

a first vibration command adding portion for adding the vibration command to any one of the position command, the speed command and the torque command for the first servo motor in a case where the vibration adding signal is input; and a second vibration command adding portion for adding the vibration command to any one of the position command, the speed command and the torque command for the second servo motor in a case where the vibration adding signal is input;

wherein the vibration command added by the first vibration command adding portion is in phase with the vibration command added by the second vibration command adding portion and wherein the torque, required for restarting the press machine after the slide stops at the bottom dead center thereof or in the vicinity of the bottom dead center, becomes small.

5. The press machine controller according to claim 1, wherein the parameter is included in an external device connected to the press machine controller.

6. The press machine controller according to claim 2, wherein the parameter is included in an external device connected to the press machine controller.

7. The press machine controller according to claim 3, wherein the parameter is included in an external device connected to the press machine controller.

8. The press machine controller according to claim 4, wherein the parameter is included in an external device connected to the press machine controller.

* * * * *